US009924416B2

(12) United States Patent
Liu et al.

(10) Patent No.: US 9,924,416 B2
(45) Date of Patent: Mar. 20, 2018

(54) METHODS, APPARATUSES AND COMPUTER PROGRAM PRODUCTS FOR FAST HANDOVER

(71) Applicant: Nokia Technologies Oy, Espoo (FI)

(72) Inventors: Yang Liu, Beijing (CN); Dajiang Zhang, Beijing (CN); Haitao Li, Beijing (CN); Claudio Rosa, Randers (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 39 days.

(21) Appl. No.: 14/907,741

(22) PCT Filed: Aug. 1, 2013

(86) PCT No.: PCT/CN2013/080655
§ 371 (c)(1),
(2) Date: Jan. 26, 2016

(87) PCT Pub. No.: WO2015/013964
PCT Pub. Date: Feb. 5, 2015

(65) Prior Publication Data
US 2016/0174112 A1    Jun. 16, 2016

(51) Int. Cl.
*H04W 36/00* (2009.01)
*H04W 12/04* (2009.01)
(Continued)

(52) U.S. Cl.
CPC ....... *H04W 36/0038* (2013.01); *H04L 9/0816* (2013.01); *H04W 12/04* (2013.01); *H04W 74/0833* (2013.01); *H04L 2463/061* (2013.01)

(58) Field of Classification Search
CPC ............. H04W 12/04; H04W 74/0833; H04W 36/0038; H04L 9/0816; H04L 2463/061
See application file for complete search history.

(56) References Cited

U.S. PATENT DOCUMENTS

2007/0060127 A1* 3/2007 Forsberg ............... H04L 63/061
455/436
2009/0003280 A1* 1/2009 Kasapidis ............ H04W 88/02
370/331
(Continued)

FOREIGN PATENT DOCUMENTS

CN    101335985 A    12/2008
CN    102215485 A    10/2011
(Continued)

OTHER PUBLICATIONS

3GPP, TS 133.401 V11.7.0, Jul. 2013.*
International Search Report and Written Opinion received for corresponding Patent Cooperation Treaty Application No. PCT/CN2013/080655 dated May 9, 2014, 12 pages.
(Continued)

*Primary Examiner* — Oussama Roudani
(74) *Attorney, Agent, or Firm* — Squire Patton Boggs (US) LLP (57) ABSTRACT

Provided are methods, corresponding apparatuses, and computer program products for a fast handover. A method comprises generating, at a source base station serving a user equipment, a first message and a second message including security information for security communication between a target base station and the user equipment after a fast handover. The method also comprises transmitting simultaneously, from the source base station, the first and second messages respectively to the target base station and the user equipment. With the claimed inventions, a fast X2 handover procedure is complemented and becomes more feasible with proposed security handlings, making it possible to decrease the service interruption during X2 handover for users and hence improve the user experiences.

20 Claims, 4 Drawing Sheets

(51) Int. Cl.
  *H04L 9/08* (2006.01)
  *H04W 74/08* (2009.01)

(56) References Cited

U.S. PATENT DOCUMENTS

2011/0159841 A1  6/2011  Escott et al.
2012/0163336 A1  6/2012  Adjakple et al.

FOREIGN PATENT DOCUMENTS

| EP | 2109278 A1 | 10/2009 |
| EP | 2135471 B1 | 8/2011 |
| EP | 2418884 A1 | 2/2012 |
| EP | 2271144 B1 | 10/2012 |
| EP | 2582164 A1 | 4/2013 |
| WO | 2006102565 A | 9/2006 |
| WO | 2008/097147 A1 | 8/2008 |
| WO | 2011/020445 A1 | 2/2011 |
| WO | 2012/146276 A1 | 11/2012 |
| WO | 2014/154245 A1 | 10/2014 |

OTHER PUBLICATIONS

Cao et al., "A Simple and Robust Handover Authentication Between HeNB and eNB in LTE Networks", Computer Networks, vol. 56, No. 8, May 2012, pp. 2119-2131.
"3rd Generation Partnership Project;Technical Specification Group Services and System Aspects;3GPP System Architecture Evolution (SAE);Security architecture (Release 12)", 3GPP TS 33.401, V12.5.0, Sep. 2012, pp. 1-121.
Extended European Search Report received for corresponding European Patent Application No. 13890600.3, dated Dec. 20, 2016, 7 pages.
"3rd Generation Partnership Project;Technical Specification Group Radio Access Network;Evolved Universal Terrestrial Radio Access (E-UTRA) and Evolved Universal Terrestrial Radio Access Network (E-UTRAN); Overall description;Stage 2 (Release 11)", 3GPP TS 36.300, V11.6.0, Jun. 2013, pp. 1-209.
"3rd Generation Partnership Project;Technical Specification Group Services and System Aspects;3GPP System Architecture Evolution (SAE);Security architecture(Release 12)", 3GPP TS 33.401, V12.8.1, Jun. 2013, pp. 1-121.

\* cited by examiner

METHODS, APPARATUSES AND COMPUTER PROGRAM PRODUCTS FOR FAST HANDOVER

RELATED APPLICATION

This application was originally filed as Patent Cooperation Treaty Application No. PCT/CN2013/080655 filed Aug. 1, 2013.

FIELD OF THE INVENTION

Embodiments of the present invention generally relate to wireless communication techniques including the 3GPP (the 3rd Generation Partnership Project) LTE technique. More particularly, embodiments of the present invention relate to methods, apparatuses, and computer program products for a fast handover.

BACKGROUND OF THE INVENTION

Various abbreviations that appear in the specification and/or in the drawing figures are defined as below:
BS Base Station
CN Core Network
C-RNTI Cell Radio Network Temporary Identity
LTE Long Term Evolution
NB Node B
NCC Next Hop Chaining Counter
NH Next Hop Chain
eNB evolved Node B
Identity ID
HO Handover
KDF Key Derivation Function
PCI Physical Cell Identifier
PRACH Physical Random Access Channel
RRC Radio Resource Control
RF Radio Frequency
RSRP Reference Signal Received Power
RSRQ Reference Signal Received Quality
UE User Equipment The Rel-12 Study Item named as Small Cell Enhancement for higher layers in RAN2 has been discussed in 3GPP. In this Study Item, it is proposed to investigate solutions in regards to improving the mobility robustness, reducing signaling overhead towards the core network, and bettering inter-node UE context transfer procedure. In addition to these, small cell related mobility procedures will also be studied in this Study Item. In one of the mobility topics, a method called fast X2 HO is proposed.

The principle behind the fast X2 HO is that a target BS or eNB reserves a certain amount of resources for the fast X2 HO and indicates a predefined PRACH and associated C-RNTI to a source eNB. When a UE sends a measurement report to the source eNB and the source eNB ascertains there is a reserved channel for the fast X2 HO, it may indicate the predefined PRACH and associated C-RNTI to the UE via an RRC message, such as an RRCConnectionReconfiguration message. After that, the UE can set up an RRC connection with the target eNB directly using the predefined PRACH and the associated C-RNTI without a network HO preparation procedure. Therefore, the legacy HO signaling is omitted between the source eNB and the target eNB.

In the legacy X2 HO, the source eNB will derive the key $K_{eNB*}$ and send the pair ($K_{eNB*}$, NCC) to the target eNB during the HO preparation. The target eNB will include the NCC into the HO command and send it to the UE, which is transparent to the source eNB. The UE will derive the same key $K_{eNB*}$. In this manner, security communication can be established between the UE and the target eNB. More information regarding key derivations during HO can be found in section 7.2.8.4 of the 3GPP TS 33.401 V12.5.0 (2012-09), which is incorporated herein by reference in its entirety.

However, in the fast X2 HO, the target eNB and the UE will not have the correct cryptography keys for security communication since the X2 interface signaling during the HO preparation is omitted. Due to this, the fast X2 HO is not applicable at least from the perspective of security communications.

SUMMARY OF THE INVENTION

Therefore, there is a need in the art to provide an efficient mechanism for establishing security communication between the UE and the target base station after the fast handover.

These and other problems are generally solved or circumvented, and technical advantages are generally achieved, by embodiments of the present invention, which include methods, apparatuses, and computer program products for a fast handover.

According to one aspect of the present invention, a method is provided, which comprises generating, at a source base station serving a user equipment, a first message and a second message including security information for security communication between a target base station and the user equipment after a fast handover. The method also comprises transmitting simultaneously, from the source base station, the first and second messages respectively to the target base station and the user equipment.

In one embodiment, the method further comprises receiving from the target base station cryptography algorithm information including an identifier of at least one cryptography algorithm and generating the first and second messages based on the cryptography algorithm information.

In another embodiment, the first message includes at least an identifier of a cryptography algorithm selected from the at least one cryptography algorithm based on security capability of the user equipment, and a derived key.

In an additional embodiment, the second message includes at least physical random access channel information and a cell radio network temporary identity predefined to be used by the user equipment for the fast handover, and the identifier of the selected cryptography algorithm.

In a further embodiment, the derived key is $K_{eNB*}$ derived through a key derivation function using, as inputs, a key $K_{eNB}$, the predefined physical random access channel information and the cell radio network temporary identity.

According to another aspect of the present invention, a method is provided, which comprises signaling cryptography algorithm information to a source base station serving a user equipment for security communication between a target base station and the user equipment after a fast handover, wherein the cryptography algorithm information includes an identifier of at least one cryptography algorithm. The method also comprises receiving, from the source base station, a message including a derived key and an identifier of a cryptography algorithm selected from the at least one cryptography algorithm for the security communication.

In one embodiment, the derived key is $K_{eNB*}$ derived through a key derivation function using, as inputs, a key $K_{eNB}$, physical random access channel information and a cell radio network temporary identity predefined to be used by the user equipment for the fast handover.

In another embodiment, the method further comprises establishing security communication with the user equipment based on the derived key and the identifier of the cryptography algorithm.

According to an additional aspect of the present invention, a method is provided, which comprises receiving, from a source base station serving a user equipment, a message including security information for security communication between a target base station and the user equipment after a fast handover, wherein the security information includes at least an identifier of a cryptography algorithm. The method also comprises deriving, at the user equipment, a key for security communication with the target base station based on the identifier of the cryptography algorithm. The method further comprises using the derived key for the security communication with the target base station after the fast handover.

In one embodiment, the method further comprises receiving, from the source base station, physical random access channel information and a cell radio network temporary identity predefined by the target base station to be used by the user equipment for the fast handover.

In another embodiment, the derived key is $K_{eNB*}$ derived through a key derivation function using, as inputs, a key $K_{eNB}$, the physical random access channel information and the cell radio network temporary identity.

According to another aspect of the present invention, an apparatus is provided, which comprises at least one processor and at least one memory including computer program code. The memory and the computer program code are configured to, working with the processor, cause the apparatus at least to generate, at a source base station serving a user equipment, a first message and a second message including security information for security communication between a target base station and the user equipment after a fast handover. The memory and the computer program code are also configured to, working with the processor, cause the apparatus at least to transmit simultaneously, from the source base station, the first and second messages respectively to the target base station and the user equipment.

According to another aspect of the present invention, an apparatus is provided, which comprises at least one processor and at least one memory including computer program code. The memory and the computer program code are configured to, working with the processor, cause the apparatus at least to signal cryptography algorithm information to a source base station serving a user equipment for security communication between a target base station and the user equipment after a fast handover, wherein the cryptography algorithm information includes an identifier of at least one cryptography algorithm. The memory and the computer program code are also configured to, working with the processor, cause the apparatus at least to receive, from the source base station, a message including a derived key and an identifier of a cryptography algorithm selected from the at least one cryptography algorithm for the security communication.

According to another aspect of the present invention, an apparatus is provided, which comprises at least one processor and at least one memory including computer program code. The memory and the computer program code are configured to, working with the processor, cause the apparatus at least to receive, from a source base station serving a user equipment, a message including security information for security communication between a target base station and the user equipment after a fast handover, wherein the security information includes at least an identifier of a cryptography algorithm. The memory and the computer program code are also configured to, working with the processor, cause the apparatus at least to derive, at the user equipment, a key for security communication with the target base station based on the identifier of the cryptography algorithm. The memory and the computer program code are also configured to, working with the processor, cause the apparatus at least to use the derived key for the security communication with the target base station after the fast handover.

According to another aspect of the present invention, an apparatus is provided, which comprises means for generating, at a source base station serving a user equipment, a first message and a second message including security information for security communication between a target base station and the user equipment after a fast handover. The apparatus also comprises means for transmitting simultaneously, from the source base station, the first and second messages respectively to the target base station and the user equipment.

According to another aspect of the present invention, an apparatus is provided, which comprises means for signaling cryptography algorithm information to a source base station serving a user equipment for security communication between a target base station and the user equipment after a fast handover, wherein the cryptography algorithm information includes an identifier of at least one cryptography algorithm. The apparatus also comprises means for receiving, from the source base station, a message including a derived key and an identifier of a cryptography algorithm selected from the at least one cryptography algorithm for the security communication.

According to another aspect of the present invention, an apparatus is provided, which comprises means for receiving, from a source base station serving a user equipment, a message including security information for security communication between a target base station and the user equipment after a fast handover, wherein the security information includes at least an identifier of a cryptography algorithm. The apparatus also comprises means for deriving, at the user equipment, a key for security communication with the target base station based on the identifier of the cryptography algorithm. The apparatus further comprises means for using the derived key for the security communication with the target base station after the fast handover.

According to another aspect of the present invention, a computer program product is provided, which, comprises a non-transitory computer readable medium having code portions stored thereon, the program code portions being a computer readable medium and configured when said computer program product is run on a computer or network device, to generate, at a source base station serving a user equipment, a first message and a second message including security information for security communication between a target base station and the user equipment after a fast handover. The program code portions are configured when said computer program product is run on a computer or network device to transmit simultaneously, from the source base station, the first and second messages respectively to the target base station and the user equipment.

According to another aspect of the present invention, a computer program product is provided, which, comprises a non-transitory computer readable medium having code portions stored thereon, the program code portions being a computer readable medium and configured when said computer program product is run on a computer or network device, to signal cryptography algorithm information to a source base station serving a user equipment for security communication between a target base station and the user equipment after a fast handover, wherein the cryptography algorithm information includes an identifier of at least one cryptography algorithm. The program code portions are configured when said computer program product is run on a computer or network device to receive, from the source base station, a message including a derived key and an identifier of a cryptography algorithm selected from the at least one cryptography algorithm for the security communication.

According to another aspect of the present invention, a computer program product is provided, which, comprises a non-transitory computer readable medium having code portions stored thereon, the program code portions being a computer readable medium and configured when said computer program product is run on a computer or network device, to receive, from a source base station serving a user equipment, a message including security information for security communication between a target base station and the user equipment after a fast handover, wherein the security information includes at least an identifier of a cryptography algorithm. The program code portions are configured when said computer program product is run on a computer or network device to derive, at the user equipment, a key for security communication with the target base station based on the identifier of the cryptography algorithm. The program code portions are configured when said computer program product is run on a computer or network device to use the derived key for the security communication with the target base station after the fast handover.

According to certain embodiments of the present invention, a fast X2 handover procedure is complemented and becomes more feasible with proposed security handlings, making it possible to decrease the service interruption during the fast X2 HO for users and hence improve the user experiences. During a key derivation processing according to the embodiments of the present invention, some parameter, such as NCC, does not need to be sent to the UE but a temporary security key can be generated according to a new KDF. Thereby, a potential security risk due to the UE autonomous access behavior can be avoided.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The embodiments of the invention that are presented in the sense of examples and their advantages are explained in greater detail below with reference to the accompanying drawings, in which.

DETAILED DESCRIPTION OF EMBODIMENTS

Embodiments of the present invention propose an efficient mechanism of performing a fast HO from a source BS to a target BS in wireless communication systems (e.g., LTE system) such that service continuity for a served UE could be achieved. During such a fast HO, the source BS plays an intermediary role in conveying the security information to both the UE and the target BS such that security communication can be established between the UE and the target BS without further signaling via the X2 interface, thereby implementing the faster HO relative to the legacy HO.

Before detailed description of various embodiments of the present invention, it should be noted that the acronyms BS, NB, and eNB may refer generally to equipments providing wireless network interfaces in a cellular wireless system such as the LTE system, and thus will be used interchangeably throughout the specification and claims.

Embodiments of the present invention will be described in detail as below.

Figure 1:
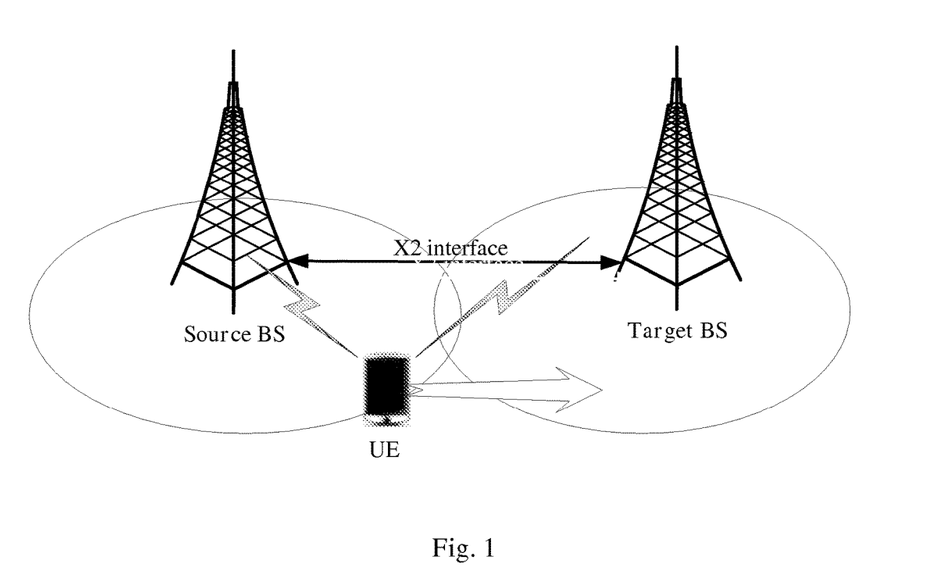
FIG. 1 is a schematic communication architecture under which various embodiments of the present invention may be practiced.

FIG. 1 is a schematic communication architecture under which various embodiments of the present invention may be practiced. As illustrated in FIG. 1, a UE is connected with a source BS via a wireless link and accepts the wireless service provided by the source BS. As the UE moves in a direction indicated by an arrow, it becomes increasingly closer to a target BS and far away from the source BS. During the movement, the UE may keep transmitting to the source BS measurement reports based on which the source BS may decide whether to direct the UE to make a HO to the target BS. It can be understood by those skilled in the art that there would be a certain number of potential target BSs around the source BS and the source BS may choose a proper one of them via an X2 interface as the final target BS based on several criteria, such as signal strength or quality (e.g., RSRP or RSRQ value) or sequence of responding to a HO request as initiated by the source BS. For a simplicity purpose, only one BS which is assumed to be the target BS is shown.

As mentioned before, during the existing fast X2 HO, the security communication cannot be implemented since the X2 signaling is omitted during the HO preparation and thus the target BS and the UE will not have the correct cryptography keys. To this end, the certain aspects of the present invention and embodiments thereof propose methods, apparatuses and computer program products to achieve security communication between the UE and the target BS, as will be discussed in detail hereinafter in connection with FIGS. 2-7.

Figure 2:
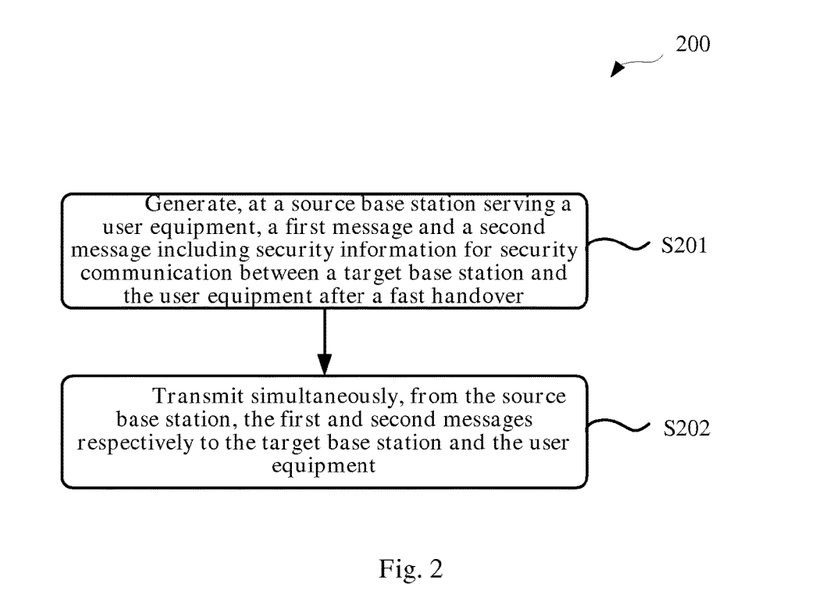
FIG. 2 is a flow chart schematically illustrating a method for a fast handover from a source BS perspective according to an embodiment of the present invention.

FIG. 2 is a flow chart schematically illustrating a method 200 for a fast HO from a source BS perspective according to an embodiment of the present invention. As illustrated in FIG. 2, at step S201, the method 200 generates, at a source BS serving a UE, a first message and a second message including security information for security communication between a target BS and the UE after a fast HO. In an embodiment, the first message includes at least an ID of a cryptography algorithm selected from the at least one cryptography algorithm based on security capability of the UE, and a derived key. In another embodiment, the second message includes at least PRACH information and a C-RNTI predefined to be used by the UE for the fast HO, and the ID of the selected cryptography algorithm. In one embodiment, the second message may additionally include the NCC and take a form of a dedicated RRC message, such as the existing RRCConnectionReconfiguration message.

In these embodiment, the derived key is $K_{eNB*}$ derived through a KDF using, as inputs, a key $K_{eNB}$, the predefined PRACH information and the C-RNTI. In the embodiments above, the first message including the derived key $K_{eNB*}$ and the ID of the selected cryptography algorithm may be sent to the target BS in a form of a newly standardized X2 message similar to the HO request message in the legacy HO procedure.

Although not illustrated in FIG. 2, in one embodiment, prior to generating the first and second messages, the method 200 receives from the target BS cryptography algorithm information including the ID of the at least one cryptography algorithm and, after that, generates the first and second messages based on the cryptography algorithm information. In addition to the ID information, when there are a number of cryptography algorithms, the source BS may also be informed by the target BS of various priorities configured for each cryptography algorithm through a newly standardized X2 message similar to the HO response message in the legacy HO procedure.

As a part of the existing fast X2 HO, the source BS may also negotiate with the target BS regarding the PRACH and the associated C-RNTI predefined to be used by the UE when the fast X2 HO to the target BS is triggered.

Subsequent to the generation of the first and second messages, the method 200 transmits simultaneously, at step S202, from the source BS, the first and second messages respectively to the target BS and the UE. Simultaneous transmission of the first and second messages enables the UE and the target BS to implement the subsequent HO procedure and security operations in a timely and synchronous manner. For example, upon receipt of the second message, the UE may generate a same key as the derived key and have access to the target BS using the allocated PRACH and C-RNTI. On the other hand, upon receipt of the first message, the target BS may know the specific PRACH and C-RNTI which would be used by the UE for the HO and get well prepared for HO by the UE.

From the above descriptions made with reference to FIG. 2, it is apparent to those skilled in the art that the source BS configured by the embodiments of the present invention transmits the security information to the target BS and the UE such that target BS and the UE are able to proceed with the security communication even if the HO is a fast X2 HO.

Figure 3:
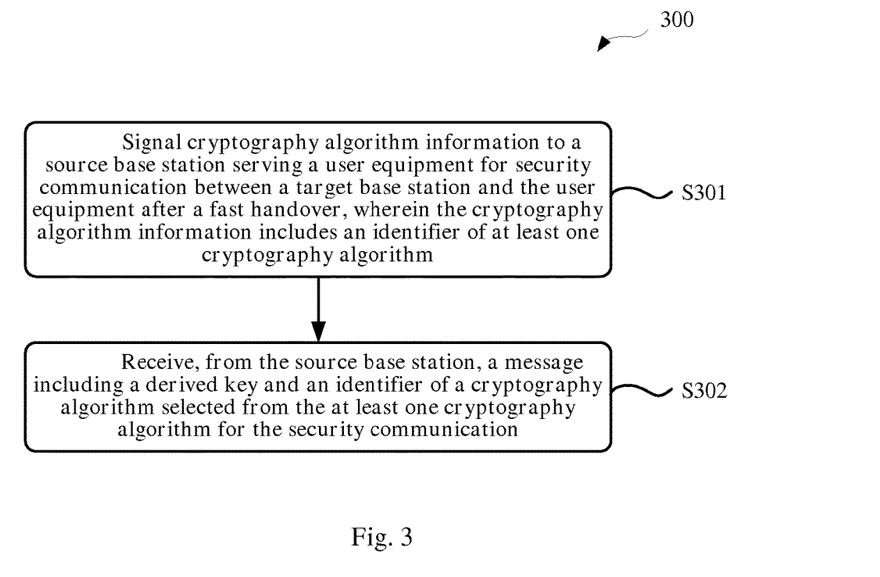
FIG. 3 is a flow chart schematically illustrating a method for a fast handover from a target BS perspective according to another embodiment of the present invention.

FIG. 3 is a flow chart schematically illustrating a method 300 for a fast HO from a target BS perspective according to another embodiment of the present invention. As illustrated in FIG. 3, at step S301, the method 300 signals cryptography algorithm information to a source BS serving a UE for security communication between a target BS and the UE after a fast HO, wherein the cryptography algorithm information includes an identifier of at least one cryptography algorithm. In one embodiment, the signaling of the cryptography algorithm information to the source BS can be implemented using a newly standardized X2 message similar to the HO response message in the legacy handover procedure, as previously discussed with reference to the method 200. The cryptography algorithm information herein may further include corresponding priorities for the corresponding cryptography algorithms.

At step S302, the method 300 receives, from the source BS, a message including a derived key and an identifier of a cryptography algorithm selected from the at least one cryptography algorithm for the security communication. As noted before, the derived key is $K_{eNB*}$ derived through a KDF using, as inputs, a key $K_{eNB}$, PRACH information and a C-RNTI predefined to be used by the UE for the fast HO. The PRACH information and the C-RNTI can be predefined by the target BS and sent to the source BS when the fast X2 HO is triggered.

Although not shown in FIG. 3, the method 300 further establishes security information with the UE based on the derived key and the identifier of the cryptography algorithm. In an embodiment, the derived key is $K_{eNB*}$ which is the same as the one derived at the UE.

Figure 4:
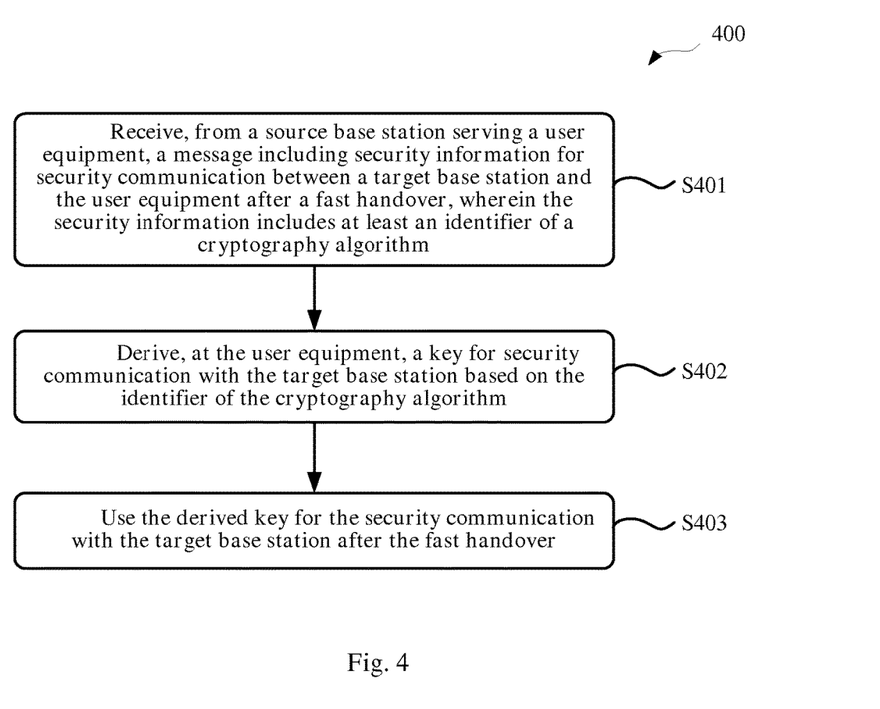
FIG. 4 is a flow chart schematically illustrating a method for a fast handover from a UE perspective according to another embodiment of the present invention.

FIG. 4 is a flow chart schematically illustrating a method 400 for a fast HO from a UE perspective according to another embodiment of the present invention. As illustrated in FIG. 4, at step S401, the method 400 receives, from a source BS serving a UE, a message including security information for security communication between a target BS and the UE after a fast handover, wherein the security information includes at least an identifier of a cryptography algorithm. In order for successful assess to the target BS, the UE also receives from the source BS PRACH information and C-RNTI predefined by the target BS for the fast X2 HO. In this manner, a likelihood of the UE's successful fast HO to the target BS is markedly improved. In an embodiment, the security information may include the NCC.

Upon receiving the message (i.e., the second message in the method 200) from the source BS, the method 400, at step S402, derives a key for security communication with the target BS based on the ID of the cryptography algorithm. As mentioned previously, since there may be a plurality of cryptography algorithm applied by the target BS, the source BS will select a proper cryptograph algorithm based on the UE's capability. In this way, the UE has the possibility and capability of deriving the same key as the one transmitted from the source BS to the target BS based on the algorithm ID. In an embodiment, the derived key is $K_{eNB*}$ derived through a KDF using, as inputs, a key $K_{eNB}$, the PRACH information and the C-RNTI. As an alternative, the derivation of the $K_{eNB*}$ could also be based on legacy parameters as known to those skilled in the art.

After that, the method proceeds to step S403 at which the method 400 uses the derived key for the security communication with the target base station after the fast HO.

Figure 5:
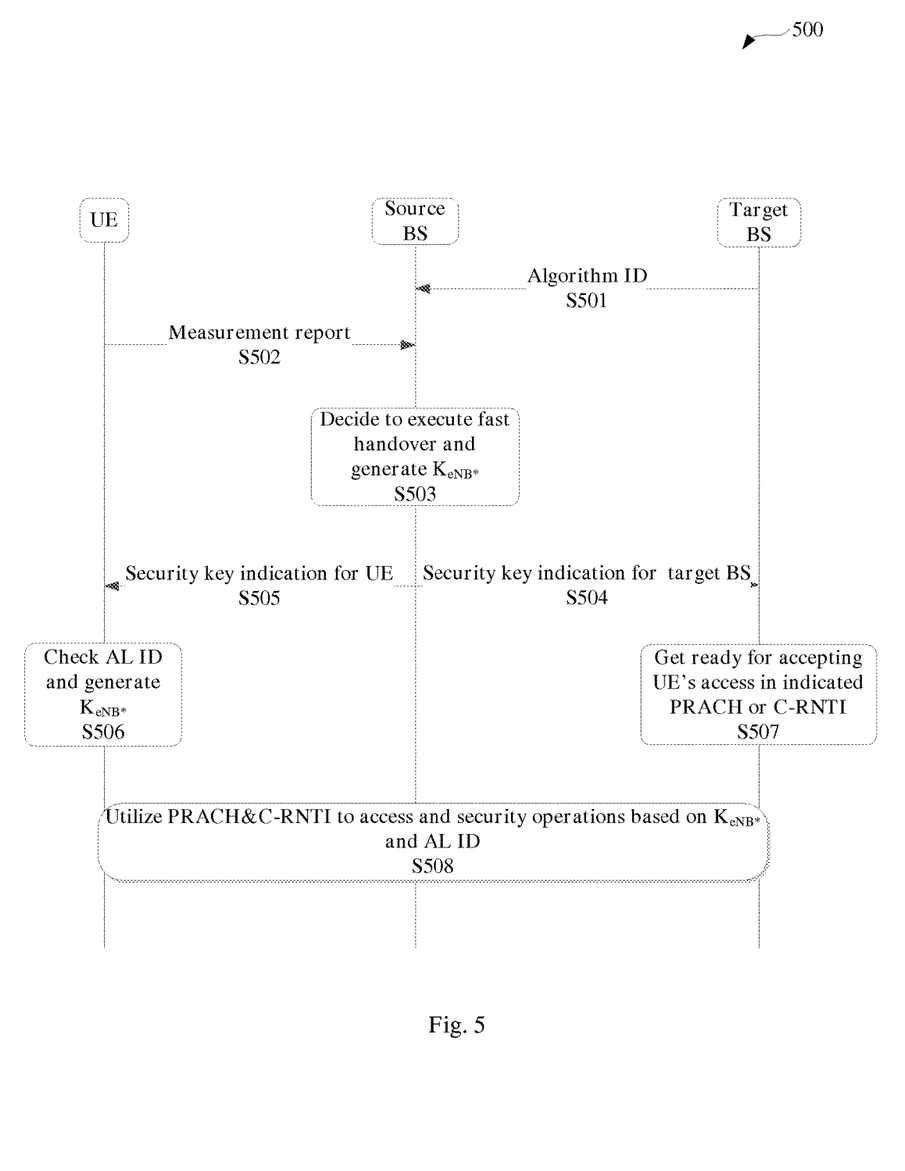
FIG. 5 is a schematic signaling diagram illustrating signaling interactions between a UE, a source BS and a target BS according to an embodiment of the present invention.

FIG. 5 is a schematic signaling diagram 500 illustrating signaling interactions between a UE, a source BS and a target BS according to an embodiment of the present invention.

As illustrated in FIG. 5, at S501, the target BS reserves certain resources for a fast X2 HO and indicates predefined PRACH information and associated C-RNTI to the source BS. In an example, the supported algorithm ID(s) and related configured priority (priorities) could also be sent to the source BS. At S502, the UE, which may be handed over to the target BS later on, sends one or more measurement reports to the source eNB. At S503, the source BS decides, based on the measurement report, to initiate a fast HO and consequently generate a key $K_{eNB*}$.

At S504, the source BS sends to the target BS an security key indication (i.e., a specific form of the first message as discussed before) which indicates the generated $K_{eNB*}$ and the algorithm ID of the cryptography algorithm selected based on the security capability of the UE and supported by the target BS, together with the PRACH or C-RNTI pre-defined by the target BS and used by the UE, to assist the target BS in mapping the key $K_{eNB*}$ with the UE.

At S505, simultaneously, the source BS sends to the UE another security key indication (i.e., a specific form of the second message as discussed before) via e.g., a dedicated RRC message (e.g., an RRCConnectionReconfiguration message) including pre-defined PRACH information, the associated C-RNTI, a NCC (optional) and the algorithm ID to the UE. At S506, the UE would check if there is algorithm ID in the received RRC message (e.g., the RRCConnection-Reconfiguration message). If this is the case, the UE would derives the $K_{eNB*}$ according to a new KDF using, as inputs, the $K_{eNB}$, the predefined PRACH information (e.g., pre-amble index), and the associated C-RNIT. In an example, instead of using the new KDF, the $K_{eNB*}$ can be derived from the $K_{eNB}$ or NH as the legacy X2 HO, together with the PCI, downlink frequency of the target BS. Since the NH is used to derive the key, NCC is needed according to 3GPP TS 33.401.

At S507, upon receiving the security key indication, the target BS may get ready for accepting the UE's access in the indicated PRACH or C-RNTI. Then, at S508, the UE may utilize the PRACH and C-RNTI to access the target BS and conduct security operations based on the $K_{eNB*}$ and the algorithm ID, and the target BS may optionally trigger a key refresh procedure following this fast X2 handover.

Figure 6:
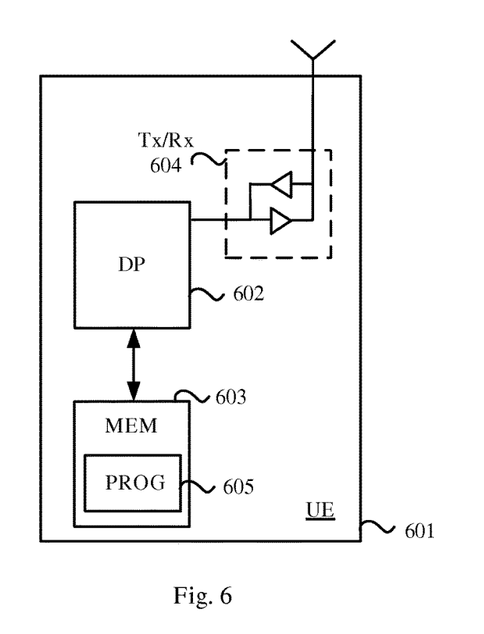
FIG. 6 illustrates a schematic block diagram of a UE that is suitable for use in practicing the exemplary embodiments of the present invention.

FIG. 6 illustrates a simplified block diagram of a UE 601 that is suitable for use in practicing the exemplary embodiments of the present invention. In FIG. 6, the UE 601 includes a data processor (DP) 602, a memory (MEM) 603 coupled to the DP 602, and a suitable RF transmitter TX and receiver RX 604 (which need not to be implemented in a same component) coupled to the DP 602. The MEM 603 stores a program (PROG) 605. The TX/RX 604 is for bidirectional wireless communications with the BS (source or target BS). Note that the TX/RX 604 has at least one antenna to facilitate communication; multiple antennas may be employed for multiple-input multiple-output MIMO communications in which case the UE 601 may have multiple TXs and/or RXs.

The PROG 605 is assumed to include program instructions that, when executed by the associated DP 602, enable the UE 601 to operate in accordance with the exemplary embodiments of the present invention, as discussed herein with the method 400.

In general, the various embodiments of the UE 601 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEM 603 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the UE 601, there may be several physically distinct memory units in the UE 601. The DP 602 may be of any type suitable to the local technical environment, and may include one or more of general purpose computers, special purpose computers, microprocessors, digital signal processors (DSPs) and processors based on multicore processor architecture, as non-limiting examples. The UE 601 may have multiple processors, such as for example an application specific integrated circuit chip that is slaved in time to a clock which synchronizes the main processor.

Figure 7:
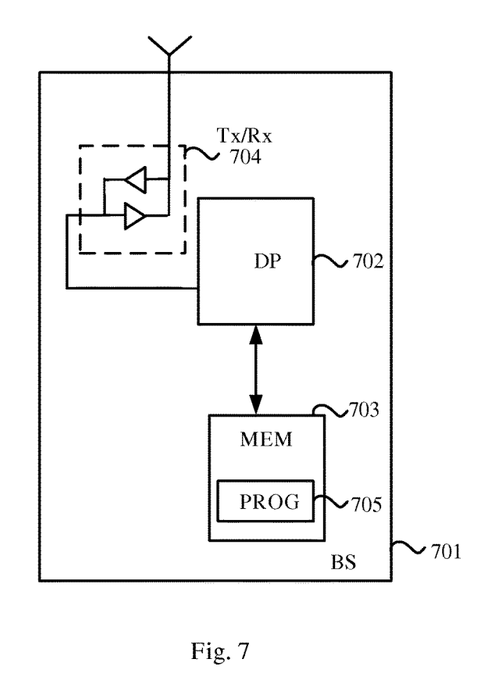
FIG. 7 illustrates a schematic block diagram of a BS that is suitable for use in practicing the exemplary embodiments of the present invention.

FIG. 7 illustrates a simplified block diagram of a BS 701 (source or target BS in the HO procedure) that is suitable for use in practicing the exemplary embodiments of the present invention. In FIG. 7, the BS 701 includes a data processor (DP) 702, a memory (MEM) 703 coupled to the DP 702, and a suitable RF transmitter TX and receiver RX 704 coupled to the DP 702. The MEM 703 stores a program (PROG) 705. The TX/RX 704 is for bidirectional wireless communications with the UE 601 as illustrated in FIG. 6. Note that the TX/RX 704 has at least one antenna to facilitate communication, though in practice a BS will typically have several. The BS 701 may be coupled via a data path to one or more external networks or systems, such as the Internet, for example.

The PROG 705 is assumed to include program instructions that, when executed by the associated DP 702, enable the BS 701 to operate in accordance with the exemplary embodiments of the present invention, as discussed herein with the methods 200 and 300.

The MEM 703 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 701, there may be several physically distinct memory units in the BS 701. The DP 702 may be of any type suitable to the local technical environment, and may include one or more of general purpose computers, special purpose computers, microprocessors, digital signal processors (DSPs) and processors based on multicore processor architecture, as non-limiting examples. The BS 701 may have multiple processors, such as for example an application specific integrated circuit chip that is slaved in time to a clock which synchronizes the main processor.

The embodiments of the present invention may be implemented by computer software executable by one or more of the DPs 602, 702 of the UE 601 and the BS 701, or by hardware, or by a combination of software and hardware.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   generating, at a source base station serving a user equipment, a first message and a second message comprising security information for secure communication between a target base station and the user equipment after a fast handover, wherein the security information is based on an identifier received from the target base station before a handover of the user equipment is performed between the source base station and the target base station, and wherein the fast handover is performed without sending a Handover Request or a Handover Preparation message to the target base station; and
   transmitting simultaneously, from the source base station, the first message and the second message to the target base station and the user equipment, respectively.

2. The method as recited in claim 1, further comprising:
   receiving from the target base station cryptography algorithm information including the identifier of at least one cryptography algorithm; and
   generating, at the source base station, the first message and the second message based on the cryptography algorithm information.

3. The method as recited in claim 2, wherein the cryptography algorithm information further includes corresponding priorities for each of the at least one cryptography algorithm.

4. A method, comprising:
   generating, at a source base station serving a user equipment, a first message and a second message including security information for security communication between a target base station and the user equipment after a fast handover, and wherein the fast handover is performed without sending Handover Request or a Handover Preparation message to the target base station; and
   transmitting simultaneously, from the source base station, the first and second messages respectively to the target base station and the user equipment,
   wherein the first message comprises at least the identifier of a cryptography algorithm selected from the cryptography algorithm based on security capability of the user equipment, and a derived key.

5. The method as recited in claim 4, wherein the derived key ($K_{eNB*}$) is derived through a key derivation function using, as inputs, a key ($K_{eNB}$), a predefined physical random access channel information, and a cell radio network temporary identity.

6. The method as recited in claim 4, wherein the derived key and the identifier of the cryptography algorithm are used by the target base station and the user equipment to establish secure communication after the fast handover.

7. The method as recited in claim 2, wherein the second message comprises at least physical random access channel information, a cell radio network temporary identity predefined to be used by the user equipment for the fast handover, and the identifier of the selected cryptography algorithm.

8. The method as recited in claim 2, wherein the second message is sent as a radio resource control message.

9. An apparatus, comprising:
   at least one processor;
   at least one memory including computer program code, wherein the memory and the computer program code are configured to, work with the processor, to cause the apparatus at least to:
   generate, at the apparatus serving a user equipment, a first message and a second message comprising security information for secure communication between a target base station and the user equipment after a fast handover, wherein the security information is based on an identifier received from the target base station before a handover of the user equipment is performed between the source base station and the target base station, and wherein the fast handover is performed without sending Handover Request or a Handover Preparation message to the target base station; and
   transmit simultaneously, from the apparatus, the first message and the second message to the target base station and the user equipment, respectively.

10. The apparatus as recited in claim 9, wherein the memory and the computer program code are configured to, working with the processor, cause the apparatus at least to:
    receive from the target base station cryptography algorithm information including the identifier of at least one cryptography algorithm; and
    generate, at the apparatus, the first message and the second message based on the cryptography algorithm information.

11. The apparatus as recited in claim 10, wherein the cryptography algorithm information further comprises corresponding priorities for each of the at least one cryptography algorithm.

12. An apparatus, comprising:
    at least one processor;
    at least one memory including computer program code, wherein the memory and the computer program code are configured to, work with the processor, to cause the apparatus at least to:
    generate, at the apparatus serving a user equipment, a first message and a second message comprising security information for secure communication between a target base station and the user equipment after a fast handover;
    transmit simultaneously, from the apparatus, the first message and the second message to the target base station and the user equipment, respectively;
    receive from the target base station cryptography algorithm information including the identifier of at least one cryptography algorithm; and generate, at the apparatus, the first message and the second message based on the cryptography algorithm information, wherein the first message comprises at least the identifier of a cryptography algorithm selected from the at least one cryptography algorithm based on security capability of the user equipment, and a derived key.

13. The apparatus as recited in claim 12, wherein the derived key ($K_{eNB*}$) is derived through a key derivation function using, as inputs, a key ($K_{eNB}$), a predefined physical random access channel information, and a cell radio network temporary identity.

14. The apparatus as recited in claim 12, wherein the derived key and the identifier of the cryptography algorithm are used by the target base station and the user equipment to establish secure communication after the fast handover.

15. The apparatus as recited in claim 10, wherein the second message comprises at least physical random access channel information, a cell radio network temporary identity predefined to be used by the user equipment for the fast handover, and the identifier of the selected cryptography algorithm.

16. The apparatus as recited in claim 10, wherein the second message is sent as a radio resource control message.

17. An apparatus, comprising:
at least one processor;
at least one memory including computer program code, wherein the memory and the computer program code are configured to, work with the processor, to cause the apparatus at least to:
receive, from a source base station serving the apparatus, a message comprising security information configured for secure communication between a target base station and the apparatus after a fast handover, wherein the security information comprises at least an identifier of a cryptography algorithm received by the source base station before a handover of the user equipment is performed between the source base station and the target base station, and wherein the fast handover is performed without sending Handover Request or a Handover Preparation message to the target base station;
derive, at the apparatus, a key for secure communication with the target base station based on the identifier of the cryptography algorithm; and
use the derived key for the secure communication with the target base station after the fast handover.

18. The apparatus as recited in claim 17, wherein the message comprising the security information is a radio resource control message.

19. The apparatus as recited in claim 17, wherein the memory and the computer program code are configured to, work with the processor, to cause the apparatus at least to receive, from the source base station, physical random access channel information and a cell radio network temporary identity predefined by the target base station to be used by the apparatus for the fast handover.

20. The apparatus as recited in claim 17, wherein the derived key ($K_{eNB}$) is derived through a key derivation function using, as inputs, a key ($K_{eNB}$), a physical random access channel information, and a cell radio network temporary identity.

* * * * *